United States Patent [19]

Matsui et al.

[11] Patent Number: 5,351,576
[45] Date of Patent: Oct. 4, 1994

[54] APPARATUS FOR ADJUSTING SLIDE STROKE OF PRESS

[75] Inventors: Akira Matsui; Shozo Imanishi, both of Sagamihara, Japan

[73] Assignee: Aida Engineering, Ltd., Kanagawa, Japan

[21] Appl. No.: 982,647

[22] Filed: Dec. 1, 1992

[30] Foreign Application Priority Data

Dec. 2, 1991 [JP] Japan ................. 3-318093
Dec. 12, 1991 [JP] Japan ................. 3-328840

[51] Int. Cl.$^5$ .................... F16C 3/04; B26D 5/08
[52] U.S. Cl. .................... 74/600; 74/595; 74/568 R; 74/571 R; 74/570; 100/282; 83/530
[58] Field of Search ........... 74/600, 836, 44, 117, 74/603, 571 M, 832, 833, 571 R, 571 L, 595, 597, 605; 100/257, 282, 291, 292; 83/530, 628

[56] References Cited

U.S. PATENT DOCUMENTS

| | | | |
|---|---|---|---|
| 4,033,252 | 7/1977 | Baker | 100/99 |
| 4,160,409 | 7/1979 | Portmann | 100/282 X |
| 4,375,785 | 3/1983 | Schoch et al. | 100/282 X |
| 4,748,883 | 6/1988 | Portmann | 83/530 |
| 4,817,456 | 4/1989 | Imanishi et al. | 74/604 |
| 4,846,014 | 7/1989 | Shiga et al. | 74/595 |
| 4,899,616 | 2/1990 | Kato | 74/571 L |
| 4,955,254 | 9/1990 | Kato | 74/603 |
| 4,987,794 | 1/1991 | Brunner et al. | 74/571 M |
| 5,189,928 | 3/1993 | Ontrop et al. | 100/282 |

FOREIGN PATENT DOCUMENTS

| | | | |
|---|---|---|---|
| 0250871 | 8/1990 | European Pat. Off. | 74/595 |
| 3112382 | 10/1982 | Fed. Rep. of Germany | 74/595 |
| 3138812 | 4/1983 | Fed. Rep. of Germany | . |
| 46-36432 | 10/1971 | Japan | 100/257 |
| 48-4356 | 2/1973 | Japan | 74/595 |
| 51-12150 | 4/1976 | Japan | 74/595 |
| 55-13039 | 3/1980 | Japan | 74/595 |
| 62-275599 | 11/1987 | Japan | 100/282 |
| 3-53827 | 11/1991 | Japan | 74/595 |
| 4-105800 | 4/1992 | Japan | 74/595 |

*Primary Examiner*—Vinh T. Luong
*Attorney, Agent, or Firm*—Steven M. Rabin

[57] ABSTRACT

A crankshaft mechanism for use with a press having a slide member, which includes an eccentric crankshaft. In one form of the mechanism, the crankshaft has a cylindrical eccentric portion. An eccentric sheave is rotatably mounted on the circumference of the eccentric portion so that its center is displaced radially from the center of the eccentric portion. A connecting member is rotatably mounted on the circumference of the sheave. The eccentric portion, sheave, and connecting member have pin-receiving bores whose axes intersect the crankshaft axis. The bores in the crankshaft and connecting rod are both aligned with the sheave bores when the crankshaft and the sheave are in predetermined angular positions. Lock pins in the eccentric portion bore are selectively engageable with the sheave bores to fix the sheave to the eccentric portion. Lock pins in the connecting rod bore are selectively engageable with the sheave bores to fix the sheave to the connecting member. By the selective engagement of the lock pins, the sheave is selective fixed to either the crankshaft or the connecting rod and freely rotatable with respect to the other. In a second form of the mechanism, the crankshaft includes two arm portions between which is connected a first eccentric section, including an eccentric crank-pin portion. A second eccentric section includes an eccentric sheave formed in multiple pieces and mounted on the circumference of the crank-pin portion. A ring member is fitted over the pieces of eccentric sheave to integrate them on the crank-pin portion.

18 Claims, 9 Drawing Sheets

APPARATUS FOR ADJUSTING SLIDE STROKE OF PRESS

BACKGROUND OF THE INVENTION

1. Field of the Invention

This invention relates to a crankshaft mechanism having a variable displacement or stroke. In particular, it relates to a crankshaft mechanism for driving a slide member of a press, wherein the mechanism can be adjusted, such as for a minimum or a maximum stroke.

2. Description of the Related Art

The stroke of a crankshaft, and therefore the displacement of the slide member, is defined herein as the distance the crankshaft moves between its top dead center and bottom dead center positions, unless otherwise specified.

The pressing rate (N) and the slide stroke (S) of a press have an interrelationship such as that shown in FIG. 8. Such an interrelationship, determined by the structure of the particular press, is defined by an inherent characteristic thereof, namely its ratio of slide stroke to pressing rate (S/N). Accordingly, if the S/N ratio is adjusted, it is possible to selectively operate a single press at various rates and levels of precision.

For this purpose, adjustable crankshaft mechanisms have been developed, and such a mechanism is schematically illustrated in FIG. 9. Referring to FIG. 9, a cylindrical crankshaft 10, with a longitudinal axis of rotation (crankshaft axis) Z1, includes an enlarged eccentric portion 11 having a center axis Z2 spaced radially a distance (hereinafter "eccentricity") e1 from the axis Z1. An eccentric sheave 20 is fitted on the outer circumference of the eccentric portion 11, and has a center axis (sheath axis) Z3 spaced radially a distance (eccentricity) e2 from the axis Z2 of the eccentric portion 11. Thus, a multieccentric structure is formed. A connecting rod 3 has an upper end portion 3U, rotatably mounted on the circumference of the eccentric sheave 20, and a lower end portion swingably supporting a slide 1. The angular position of the eccentric sheave 20 with respect to the eccentric portion 11 is adjustable. Therefore, by adjusting the relative angular positions of the eccentric portion 11 and the eccentric sheave 20, it is possible to freely change the composite eccentricity with respect to the crankshaft axis Z1 (distance of the sheath axis Z3 from the crankshaft axis Z1), so as to adjust the stroke of the slide 1. In particular, the composite eccentricity can be set at values within the range from |e1−e2| to (e1+e2). The minimum composite eccentricity |e1−e2| corresponds to when the eccentricities e1 and e2 are in opposite directions, and thus opposite to that shown in FIG. 9. The maximum composite eccentricity (e1+e2) corresponds to when the eccentricities e1 and e2 are in the same direction, as illustrated in FIG. 9.

Mechanisms for adjusting the slide stroke are known, for example, from Japanese Patent Publication No. 48-4356, Japanese Patent Publication No. 51-12150, Japanese Utility Model Publication No. 55-13039, U.S. Pat. No. 4,033,252 and German Patent No. 3112382. Such conventional mechanisms have a complicated structure, and the component parts have large diameters or other large dimensions, irrespective of the slide stroke. Furthermore, when the slide stroke is adjusted, the relationship between the rotational angle of the crankshaft (i.e., the crank angle), and the motion of the slide, is changed. This is disadvantageous in a press which is used in association with various different equipment. Also disadvantageous is that when the slide stroke is changed, the die height changes as well.

A crankshaft mechanism which has built-in (internal) means for switching between two different strokes, is known from U.S. Pat. No. 4,846,014. That crankshaft mechanism has parts with small diameters and other small dimensions. That mechanism also is capable of maintaining the same die height and the same relationship of crank angle to slide motion, even when the operative stroke is changed. A slide stroke adjusting apparatus having an external switching mechanism is known from Japanese Patent Laid-Open No. 4-105800.

Recently, demands have strengthened for presses for which capital and maintenance costs are reduced, working precision is increased, and the size in three-dimensions is decreased. However, even with the above-described crankshaft mechanisms, these demands sometimes cannot be met.

For example, an apparatus having a built-in switching mechanism, such as is disclosed in U.S. Pat. No. 4,846,014, includes a cylinder device having upper and lower pistons fitted in bores which are formed in the eccentric portion, the eccentric sheave, and the connecting rod. The bores can be aligned so that the pistons can fix the sheave alternatively to either the eccentric portion or the connection rod. This leaves the non-fixed one of the sheave and the eccentric portion free to rotate with respect the other. Such a construction requires a large number of component parts, and is thus expensive. In addition, this construction requires complicated and very precise machining and assembly. Further, replacement of the pistons, packings, etc. is a laborious operation.

With an apparatus having an external switching mechanism, it is necessary to provide a space within which the eccentric bush (eccentric sheave) can move in the axial direction of the crankshaft. Reductions in size therefore cannot easily be achieved in the narrow interior of the crown in which the crankshaft is mounted. Further, a rotational gap in the crankshaft bearing makes it essential to provide a gear backlash. Therefore, demands for higher precision cannot easily be met.

SUMMARY OF THE INVENTION

An object of the invention is to provide a crankshaft mechanism for adjusting the slide stroke of a press, the apparatus being capable of easily and quickly switching the slide stroke without causing changes in the die height or the slide motion.

Another object of the invention is to provide a crankshaft mechanism able to adjust the slide stroke of a press, which mechanism can be provided with a predetermined composite eccentricity, yet have reduced size and be able to rotate with increased speed.

In accordance with one aspect of the invention, there is provided a crankshaft mechanism for use with a press having a slide member, the mechanism comprising an eccentric crankshaft. The crankshaft is mounted within a housing, for rotation about a longitudinal crankshaft axis. The crankshaft has a cylindrical eccentric portion, the center of which is displaced radially from the crankshaft axis. An eccentric sheave is rotatably mounted on the outer circumference of the eccentric portion and has an outer circumference with a center displaced radially from the center of the eccentric portion. A connecting member to the slide member is rotatably mounted on the outer circumference of the sheave.

The eccentric portion, the sheave, and the connecting member have bores whose axes intersect the crankshaft axis. A first bore in the eccentric portion contains axially movable first lock pins. A second bore in the connecting member contains axially movable second lock pins. When the crankshaft and the sheave are in a bottom dead center position (so that the centers of the eccentric portion and the sheave are directly below the crankshaft axis), bores in the sheave are aligned with the bores in the eccentric portion and the connecting member.

The first lock pins are selectively engageable with the bore in the sheave, to fix the sheave to the eccentric portion, so that the sheave can be rotated with the crankshaft relative to the connecting member. The second lock pins are selectively engageable with one of the bores in the sheave, to fix the sheave to the connecting member, so that the crankshaft can be rotated relative to the sheave and connecting member. The mechanism further comprises a first lock pins moving means for simultaneously moving the first lock pins in opposite axial directions of the first bore, into engagement with the bores in the sheave.

These means include a first projecting and retracting means which apply a switching force to the first lock pins, for projecting and retracting the first lock pins respectively into and from the bores in the sheave. A switching force transmitting means is fitted in an axial bore in the crankshaft for transmitting the switching force to the first projecting and retracting means. For example, the switching force transmitting means may be a rotary member rotatably fitted in the axial bore, and the first projecting and retracting means may be cam pins provided at an inner end of the rotary member to engage grooves in the first lock pins so as to project and retract the first lock pins when the rotary member is rotated in respective opposite directions. A second lock pins moving means is provide for projecting and retracting the second pins into and from the corresponding bore in the eccentric sheave.

When the mechanism is to have a maximum composite eccentricity, and therefore provide a maximum slide stroke, but the sheave is fixed to the connecting member, a switching operation is required. Therefore, with the crankshaft in a bottom dead center position, a rotational switching force is applied from the exterior of the crankshaft, through the rotary member, to the cam pins, which project the first lock pins into the corresponding bores of the sheave. Then, the second projecting and retracting means is either manually or automatically operated to retract the second lock pins from the corresponding bore of the sheave.

As a result, the eccentric sheave, which had been integral with the connecting member, is shifted so as to be made integral with and fixed to the crankshaft, without causing or requiring any changes in the relative rotational positions of the connecting member, the eccentric sheave, or the crankshaft. Thus, the slide stroke can be changed without causing a change in the die height.

When the eccentric sheave has been integrated with the crankshaft, and is to be shifted so as to be made integral with the connecting member, the second projecting and retracting means, and then the first projecting and retracting means, are operated in a manner opposite to that just described. That is, the first and second projecting and retracting means are operated respectively to retract the first lock pins from, and project the second lock pins into, the corresponding bores in the sheave.

The above described lock pins, and respective means for moving them in bores of the crankshaft, connecting member and sheave, make it possible to charge the composite eccentricity without changing the position of the sheave. Thus, it is possible to provide a mechanism which can be produced at low cost, and which is capable of quickly, easily and reliably changing the slide stroke of a press, without causing or requiring changes in the die height.

According to another aspect of the invention, there is provided a crankshaft mechanism for use with a press having a slide member. The mechanism comprises an eccentric crankshaft to be mounted in a housing for rotation about a longitudinal crankshaft axis. The crankshaft has first and second axially spaced-apart shaft sections, first and second axially spaced-apart arm portions connected between the shaft sections, and first and second eccentric sections between the arm portions.

The first eccentric section is a crank-pin portion, fixed to the arm portions. The crank-pin portion has a center axis spaced radially from the crankshaft axis. The second eccentric section includes an eccentric sheave rotatably mounted on the outer circumference of the crank-pin portion. The sheave has an outer circumference whose center is displaced radially from the axis of the crank-pin portion. The second eccentric section also includes a ring member, fitted over the eccentric sheave, and about which a connecting member to the slide member is rotatably connected. The sheave has a divided structure, and is composed of, for example, two pieces, which can be fitted to the circumference of the crank-pin portion from a radial direction, before being retained there by sliding the ring member over them.

This mechanism has advantages based on the following point: In an arm-type crank structure, since the distance between the points of support of the journal (crankshaft) is increased by the axial thickness of the arm portions, strength requirements dictate that the journal diameter is greater than that of full-eccentric-type crank structures (such as those disclosed in U.S. Pat. Nos. 4,033,252 and 4,846,014). However, the eccentric crank-pin portion of a double-arm type crank structure has a diameter which is reduced in comparison to that of the eccentric portion of a full-eccentric-type crank structure. Thus, if an eccentric sheave is fitted on a crank-pin portion, between arm portions of an arm-type crank structure, the diameter of the sheave may also be reduced without reducing the composite eccentricity of the crank-pin portion and sheave. This arrangement therefore provides an advantage of reduced size of the eccentric sections. Further, if the circumferential speed of the composite eccentric sections is limited by other factors to some constant value, a reduction in sheave diameter translates into an advantageous increase in maximum rotational speed. These advantages more than compensate for the disadvantage (i.e., the increase in the journal diameter).

To assemble the crank mechanism according to this second aspect of the invention, the divided eccentric sheave is brought close to and fitted on the eccentric crank-pin portion. The pieces are brought from radial directions to relative positions at which the composite eccentricity of these eccentric members is a minimum (i.e., wherein the eccentricities of the sheave and the crank-pin portion are measured in opposite directions with respect to the crankshaft axis). That is, the center axes of the divided sheave and the crankpin portion are spaced from the crankshaft axis in opposite directions. Thereafter, the ring member is slid in the axial direction of the crankshaft and fitted on the eccentric sheave, so that the eccentric sheave is integrally fixed in place. As a result, it is possible to achieve a reduction in the size, and an increase in the rotational speed, of the entire system. Moreover, the same maximum value of composite eccentricity, as that in a conventional full-eccentric-type crankshaft mechanism having two eccentric members, can be assured.

In brief, a crankshaft mechanism according to the second aspect of the invention has a double-arm-type crank structure which includes a first eccentric section in the form of a crank-pin portion, and a second eccentric portion in the form of a divided eccentric sheave. The divided sheave is fitted on the first eccentric section from the radial direction, and integrated by means of a ring member. Thus, the eccentric sheave can be easily and securely mounted on the inter-arm crank-pin portion. Since the outer diameter of the crank-pin portion is reduced, and thus the outer diameter of the eccentric sheave also can be reduced, it is possible to achieve both a reduction in the size and an increase in the rotational speed of the system.

According to a third aspect of the invention, there is provided a crankshaft mechanism in which the features according to the above-described first and second aspects of the invention are combined, and the advantages of both are obtained. That is the crankshaft mechanism has:

(1) a double-arm-type crank structure which includes a first eccentric section, and a divided eccentric sheave fitted on the first eccentric section and integrated by means of a ring member, according to the second aspect of the invention, and (2) an arrangement of bores, first and second lock pins, and first and second lock pins moving means for fixing the divided sheave and ring member selectively and alternatively to the connecting member or the first eccentric section, according to the first aspect of the invention.

BRIEF DESCRIPTION OF THE DRAWINGS

These and other features and advantages of the invention will be more clearly understood from the following detailed description of the preferred embodiments with reference to the accompanying drawings in which.

DESCRIPTION OF THE PREFERRED EMBODIMENTS

FIGS. 1A to 4 illustrate a first embodiment of the invention.

Figure 1A:
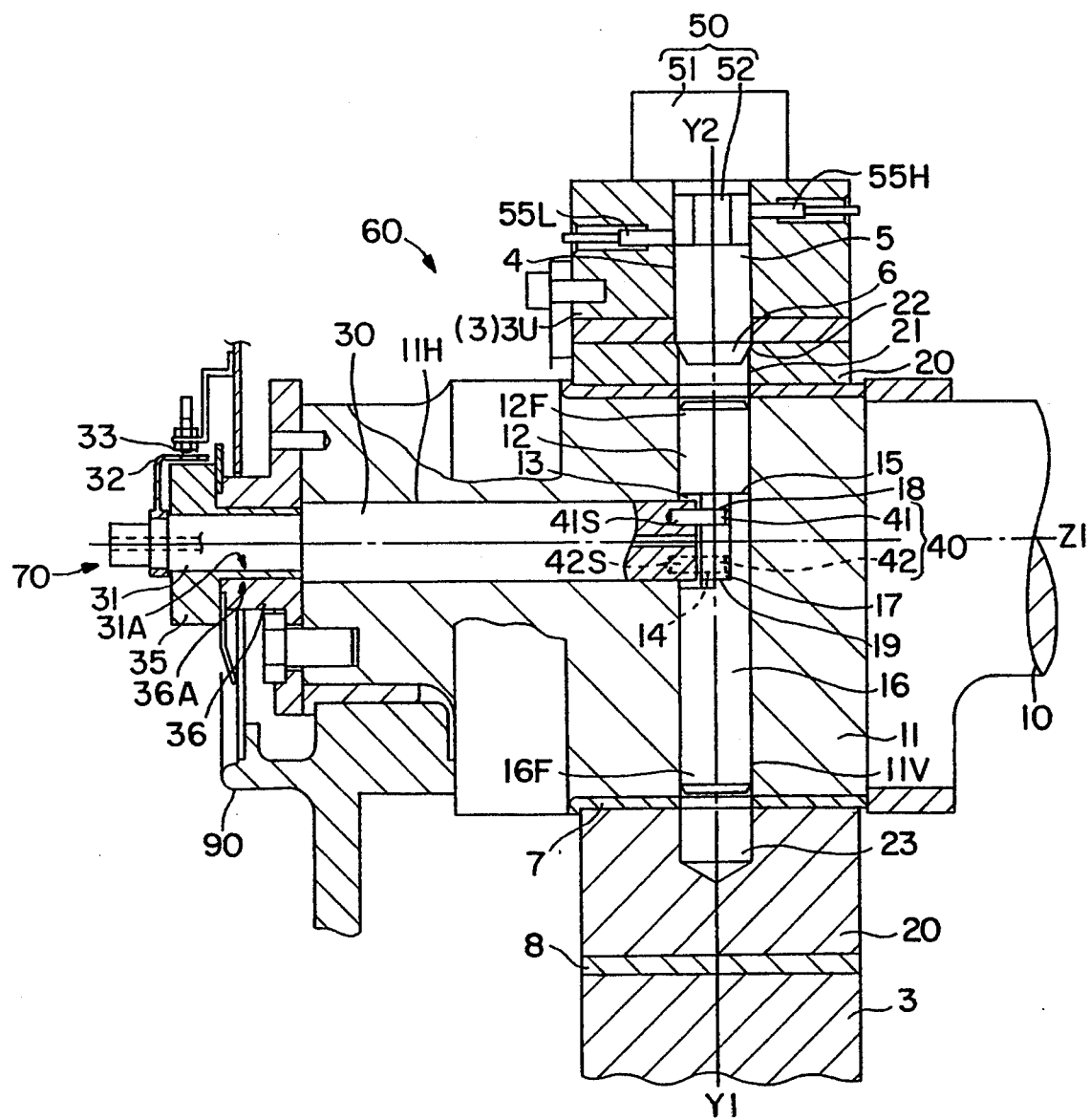
FIG. 1A is a longitudinal sectional view of the adjustable crankshaft mechanism according to a first embodiment of the invention, with the eccentric sheave integral with the connecting member.
Figure 2A:
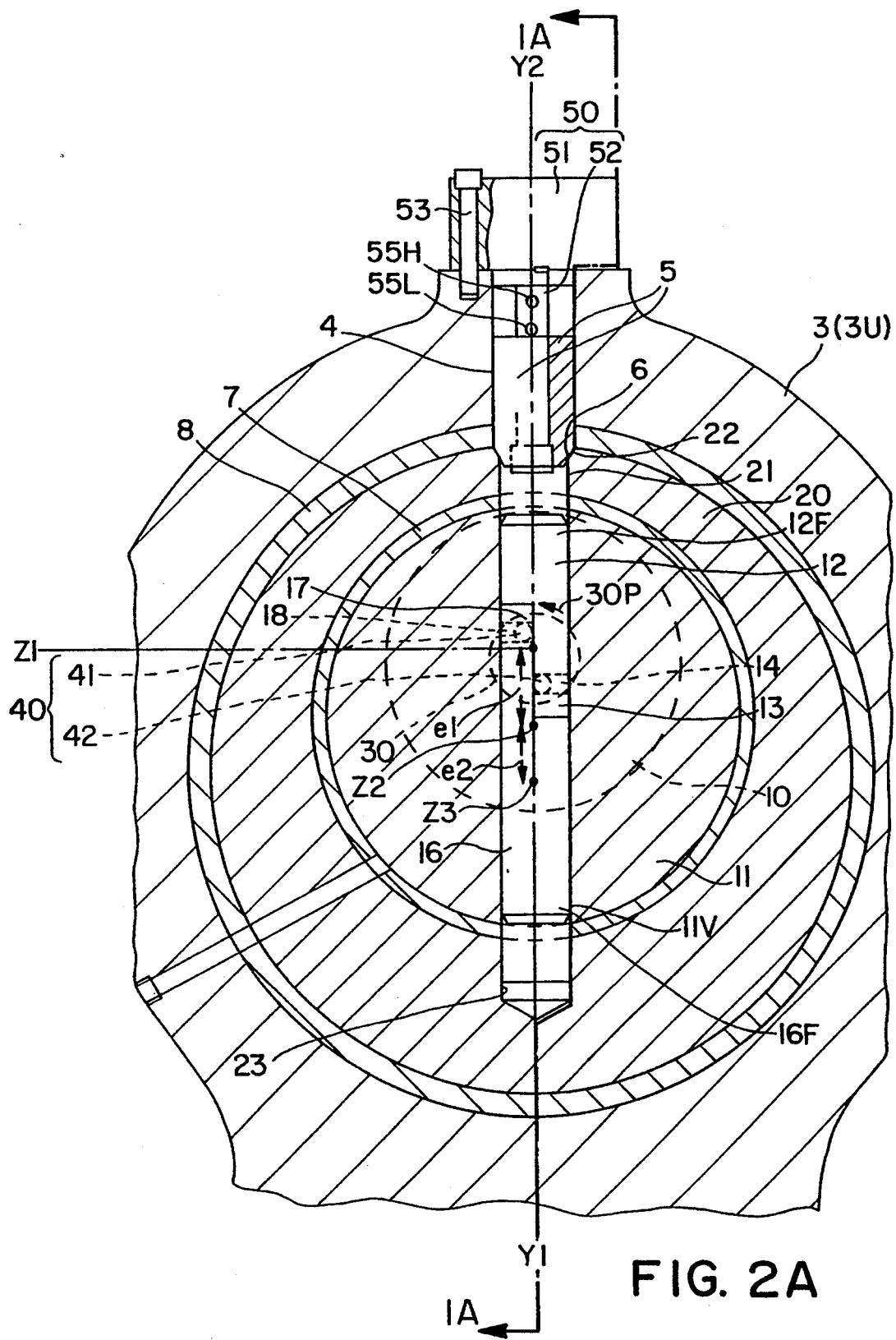
FIG. 2A is a sectional view, taken on line II—II of FIG. 1A.

Referring to FIGS. 1A and 2A, there is shown a crankshaft mechanism 60, having a crankshaft 10 and an eccentric sheave 20. The crankshaft mechanism is mounted for rotation in a housing 90, for rotation about its horizontal longitudinal axis (crankshaft axis) Z1. An eccentric portion 11 of a crankshaft 10, and the eccentric sheave 20 are disposed in such a manner that they are eccentric in the same direction. In FIGS. 1A and 2A, the crankshaft mechanism 60 is in a bottom dead center position. Therefore, the center (center axis) Z2 of the eccentric portion 11, and the center (sheave axis) Z3 of the sheave 20, are at their lowermost positions, directly below the crankshaft axis Z1 (as viewed in FIGS. 1A and 2A). Thus, their composite eccentricity is maximum. A connecting member or rod 3 has a cylindrical upper end portion 3U rotatably mounted on the outer circumference of the sheave 20, with the center of the cylindrical portion 3U coinciding with the center Z3 of the sheave 20. A lower end of the connecting rod 3 is connected to a press slide (not shown).

The eccentric portion 11 and the eccentric sheave 20 are formed with a combination of radial, pin-receiving bores, namely, radial first bore 11V in the eccentric portion 11, and radial third bores 21 and 23 in the sheave. In the positions shown in FIGS. 1A and 2A, all of the bores 11V, 21 and 23 are coaxial with a vertical axis (a first common axis Y1) intersecting the crankshaft axis Z1. Similarly, the upper end portion 3U of the connecting rod 3 is formed with a pin-receiving radial (vertical) second bore 4. In the position shown in FIGS. 1A and 2A, the bore 4 is axially aligned, along a common axis Y2 intersecting the crankshaft axis Z1, with a radial bore in the sheave 20. In the present embodiment, this latter bore in the sheave 20 is the bore 21, so that the bores 4 and 21 (and the common axis Y2) are coaxial with the common axis Y1.

A bush 7 is fitted on the inner periphery of the eccentric sheave 20, while a bush 8 is fitted on the inner periphery of the connecting rod upper end portion 3U.

Slideable lock pins are provided in the radial bores for locking the sheave to the connecting rod and/or the crankshaft. Thus, a first pair of slideable lock pins 12, 16 is provided for releasably locking the sheave 20 against rotation relative to the crankshaft. The lock pin 12 is slideably positioned in the radial bore 11V so as to be capable of projecting in the direction of the axis Y1, respectively into and from the corresponding sheave bore 21. Similarly, the lock pin 16 is slideably positioned in the radial bore 11V so as to be capable of projecting and retracting in the direction of the axis Y1, respectively into and from the sheave bore 23. Also, a pair of lock pins 5 is slideably positioned in the radial bore 4 of the upper connecting rod portion 3U, so as to be capable of projecting and retracting in the direction of the axis Y2, respectively into and from the sheave bore 21.

Figure 1B:
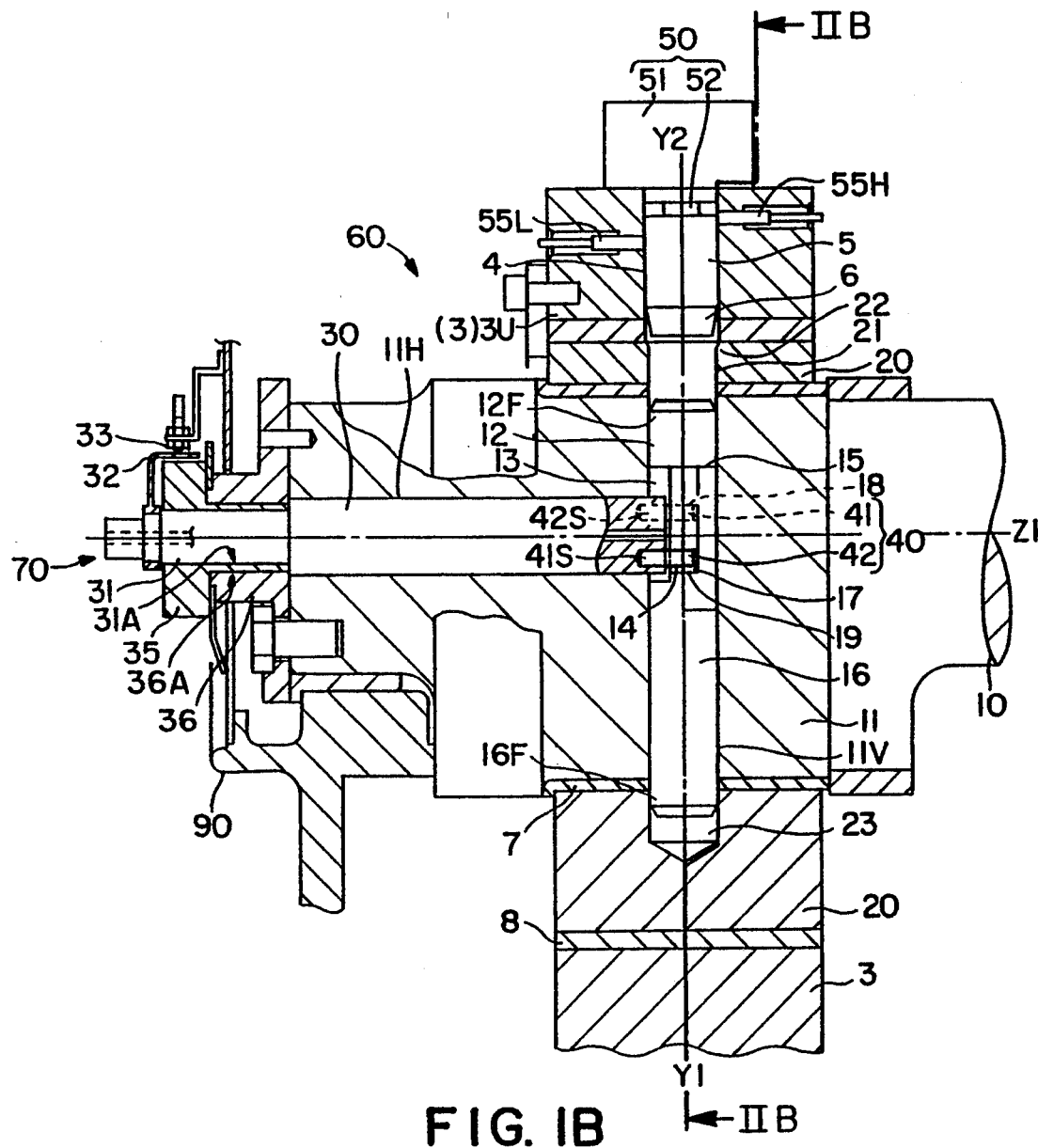
FIG. 1B is a longitudinal sectional view of the adjustable crankshaft mechanism according to a first embodiment of the invention, with the eccentric sheave integral with the eccentric portion of the crankshaft.
Figure 2B:
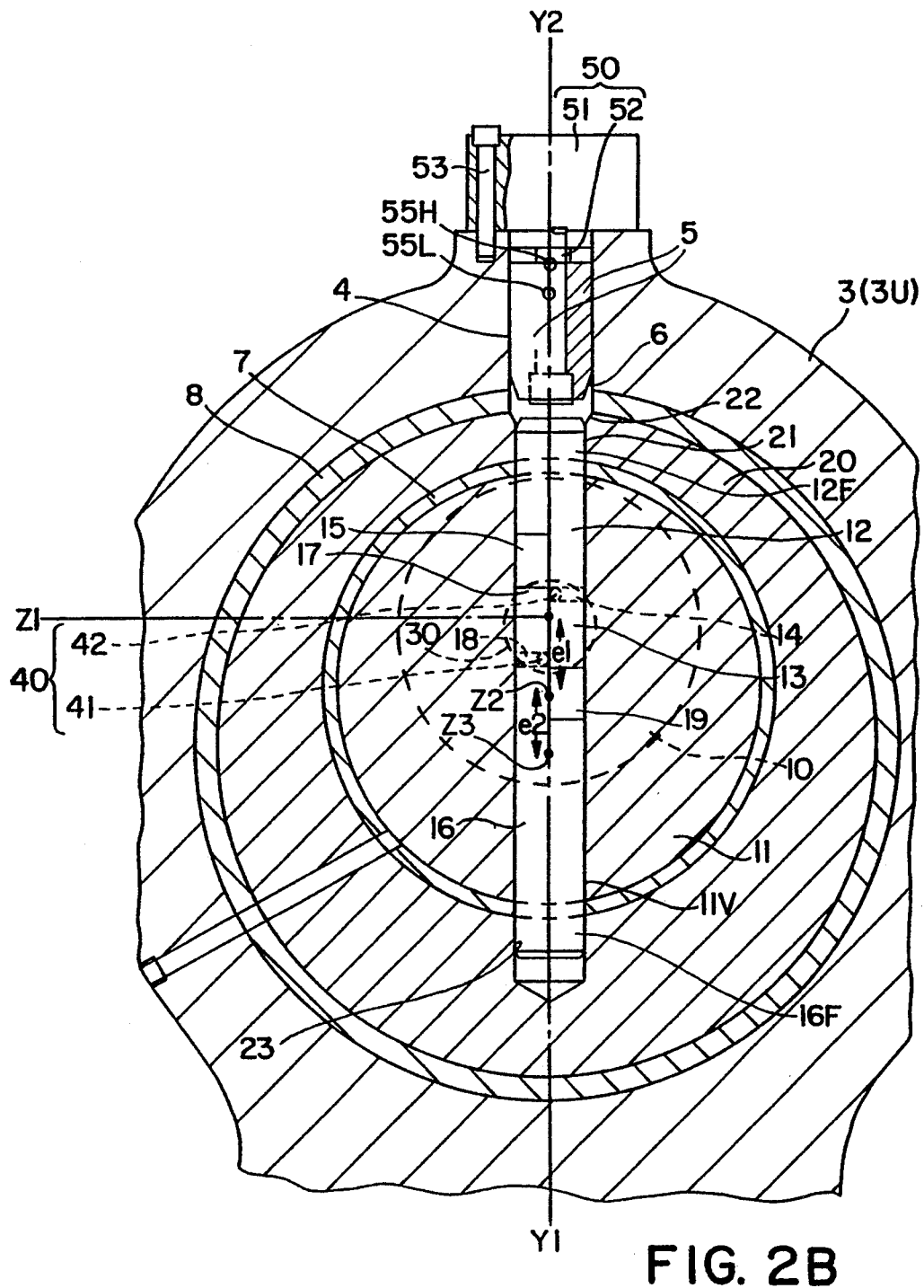
FIG. 2B is a sectional view, taken on line II—II of FIG. 1B.
Figure 3:
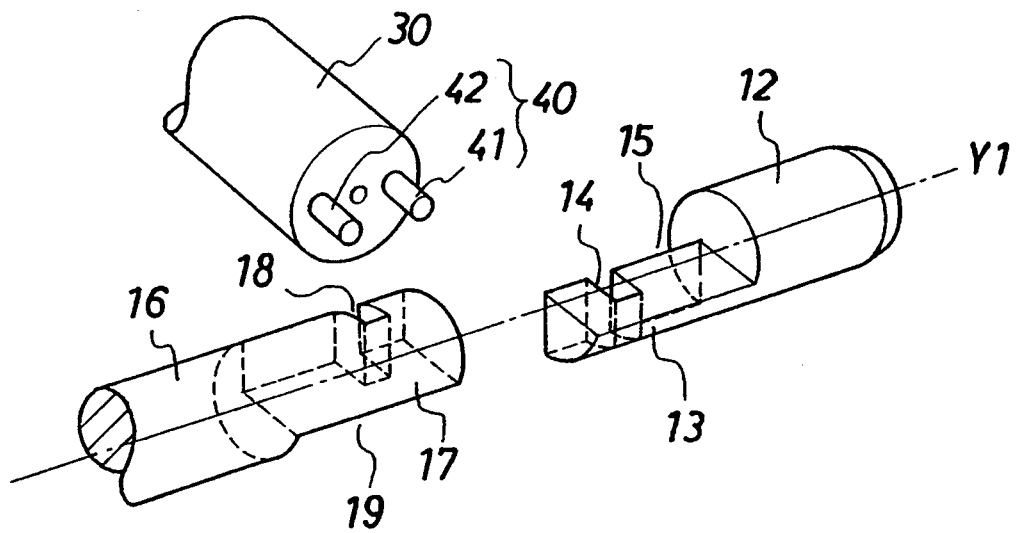
FIG. 3 is an exploded perspective view of engaging portions the rotary member, the cam pins and the first lock pins.

When the lock pins 12 and 16 are projected into the corresponding sheave bores 21 and 23, and the lock pins 5 are positioned entirely within the radial bore 4, so as to be retracted from the bore 21 as shown in FIGS. 1B and 2B, the sheave 20 is locked only to the crankshaft 10, so as to be rotatable therewith relative to the connecting rod 3. In this condition, the mechanism has a composite eccentric member, formed by the eccentric crankshaft portion 11 and the eccentric sheave 20, with a composite eccentricity equal to the distance from the crankshaft axis Z1 to the sheave axis Z3. Since the center of the eccentric portion 11 is located between, and in a vertical line connecting the crankshaft axis Z1 and the sheave axis Z3, the composite eccentricity may be expressed as the sum (e1+e2), where e1 is the eccentricity of the eccentric portion 11 relative to the axis Z1, and e2 is the eccentricity of the sheave 20 relative to the axis Z2.

Only one of the lock pins 12 and 16, and a corresponding one of the sheave bores 21 and 23, actually are required in order to lock the sheave 20 to the eccentric portion 11. However, all of the power generated to rotate the crankshaft, and thus to raise and lower the connecting rod and slide member, is transmitted through the eccentric portion 11, and the eccentric sheave 20 integral therewith. Therefore, the two lock pins 12 and 16 and two sheave bores 21 and 23 are provided in order to very securely lock the sheave 20 to the eccentric portion 11.

The first pair of pins 12, 16 is configured to be slideably moved or held, within the bore 11V, by a first lock pins moving means 70, to be described in detail below. As shown in FIG. 2A, the lock pins 12 and 16 have respective front ends 12F and 16F, facing radially outwardly toward the respective bores 21 and 23. The lock pins 12 and 16 also have respective inward end portions 13 and 17 overlapping each other in the vicinity of the axis Z1. These front end portions occupy substantially the entire cross sections of the bore 11V. However, as shown in detail in FIGS. 3, 4a and 4b, a part of each end portion 13, 17, corresponding to approximately ¾ of the circumference of the respective lock pin 12, 16, is cut off, so that the respective end portions 13, 17 can overlap each other.

Specifically, at the inward end portions of the lock pins 12, 16 there are formed respective notch spaces 15, 19, each corresponding to approximately ¾ of the circumference of the respective lock pin. The remaining pads 13, 17, corresponding to approximately ¼ of the circumference, form projections of the respective lock pins 12, 16. The notch spaces 15, 19, partly defined by the respective projections 13, 17, are of equal length and thus receive the projections 17, 13 of the respective other lock pins 16, 12. The projections 13, 17 are formed with respective transverse grooves 14, 18, which are equidistantly spaced from their inward ends and extend perpendicularly to the axis Y1 of the bore 11V.

Description next is given of the first lock pins moving means 70, with reference to FIGS. 1A–4. Referring first to FIG. 1A, the first lock pins moving means 70 includes a cylindrical rotary member 30 rotatably mounted in a horizontal cylindrical bore 11H in the crankshaft 10. The bore 11H extends along the crankshaft axis Z1 and opens into the radial bore 11V. Horizontally extending cam pins 41 and 42 are attached to a forward (inward) end of the rotary member 30. The forward end of the rotary member extends into the bore 11V, where it occupies a portion of the notch spaces 15, 19. The cam pins 41, 42 extend from the forward end of the rotary member, past the center axis Y1, and are received, respectively, in the grooves 18, 14 of the projections 17, 13. The cam pins 41, 42 have a diameter which allows them to slide in the grooves 18, 14 in the direction of the radial axis Y1 when the rotary member 30 is rotated.

Figure 4A:
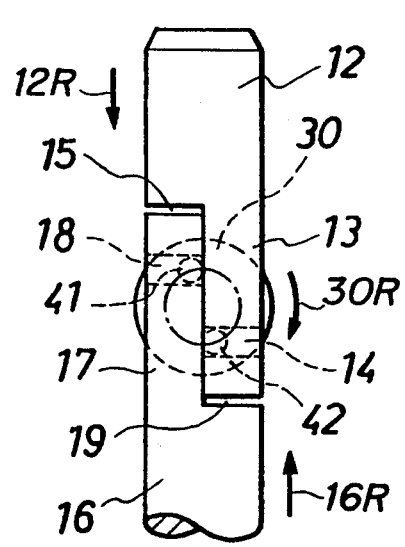
FIG. 4A and 4B are views of inward portions of the first lock pins, respectively in their retracted and projected positions.
Figure 4B:
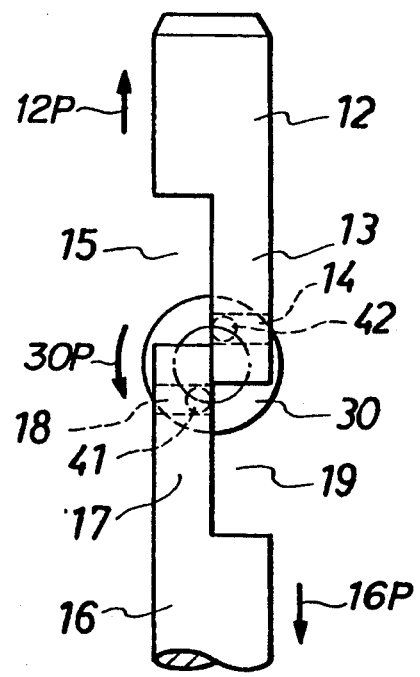

FIGS. 4A and 4B show both the rotary member and cam pins in their extreme clockwise and counter-clockwise positions, respectively. As illustrated in these figures, clockwise and counter-clockwise rotations of the rotary member 30 begin and end with the cam pin in each lock pin, in substantial abutment with an adjacent side surface of the opposing lock pin. Referring to FIG. 4A, to retract the first lock pins 12 and 16 from their projected position, the rotary member 30 is rotated approximately 140° in the direction of the arrow labeled 30R (clockwise in FIG. 4A). During such rotation, the cam pins 41, 42 are able to slide in the transverse grooves 18, 14, while describing circular arcs and pushing the corresponding first lock pins 16, 12, simultaneously in the directions of retraction respectively indicated by the arrows 16R, 12R. Similarly, as shown in FIG. 4B, to project the pins 12 and 16 from their retracted positions, the rotary member 30 is rotated approximately 140° in the direction of the arrow labeled 30P (counter-clockwise in FIG. 4B). Thus, the cam pins 41, 42 push the corresponding lock pins 16, 12 in the directions of projection respectively indicated by the arrows 16P, 12P.

The forces required to project and retract the lock pins 12 and 16 into and from engagement with the sheave bores 21 and 23, and retain the lock pins in their projected and retracted positions, are transmitted through the rotary member 30 to cam pins 42, 41. The forces required to project and retract the lock pins 12 and 16 are applied to the rotary member 30 by a rotary drive 72 (schematically illustrated in FIG. 11). The rotary member 30 is confined to, or released from its rotational position, by a fixing means and pressure media. In the present example, the pressure media includes a bush 35 provided on an outer shaft portion 31 of the rotary member 30. A flange 36, bolted to the end of the crankshaft 10, surrounds an inner portion of the bushing. The fixing means includes a pressure screw (not shown). Thus, the bush 35 is disposed between an outer peripheral surface 31A of the outer shaft portion 31 and an inner peripheral surface 36A of the flange 36. The pressure screw is turned suitably to cause the rotary member 30 to be fastened with, or relieved from, a frictional force exerted by the pressure media, including the bushing 35, against the outer peripheral surface 31A of the outer shaft portion 31 and the inner peripheral surface 36A of the flange 36, whereby the rotary member 30 is held or released.

For example, the bush 35 may be the ETP bush produced by Miki Pulley Kabushiki Kaishi of Japan. This ETP bush contains a chamber (not shown) which can be expanded, by application of the pressure screw to pressure media within the chamber, to expand the bush. By expanding, the bush 35 locks the outer shaft portion 31 to the flange 36. By reducing the pressure applied to the pressure media, the bush 35 contracts, so that the outer shaft portion 31 is released from the flange 36.

The angular position of the rotary member 30 indicates to which member, i.e., the connecting rod 3 or the eccentric portion 11, the sheave 20 is locked, and thus indicates the composite eccentricity, and correspondingly, the slide stroke of the crankshaft mechanism. The angular position of the rotary member 30 is detected by using a suitable conventional electro-optic or electro-mechanical detection device, including a detection member 32, mounted on the outer shaft portion 31, and a stationary first position detecting sensor 33.

Description next is given of the second pair of lock pins 5, and the manner in which they are moved in the radial bore 4, with reference to FIGS. 1A, 1B, 2A and 2B. The lock pins 5 have forward, or inward, end portions 6 tapered downward, as viewed in FIG. 1A. The upper sheave bore 21 has similarly tapered portion 22. Therefore, when the second lock pins 5 are pushed downward, the tapered portions 6 are brought into snug engagement with the tapered portion 22, thus locking the eccentric sheave 20 to the connecting 3. The tapered portions 6 and 22 are provided in order to securely link the eccentric sheave 20 to the connecting rod 3, without any play in the lock pins 5 in the radial direction.

When the eccentric sheave 20 is fixed to the connecting rod 3 by the lock pins 5 and the crankshaft is rotated relative thereto, the sheave 20 moves together with the connecting rod upper end portion 3U. Under these conditions, the sheave 20 has applied to it from the rotary crankshaft only a very small amount of torque. Therefore, a highly precise pressing operation can be assured.

The second lock pins moving means 50 comprises a cylinder device 51 having a piston means such as piston rods 52, connected to the second lock pins 5. The entire moving means 50 is secured by a bolt 53 to an outer side of the connecting rod upper end portion 3U, as shown in FIG. 2A. Moving the piston means 52 downwardly pushes the lock pins 5 into engagement with the sheave bore 21, so as to lock the eccentric sheave 20 to the connecting rod 3, as shown in FIGS. 1A and 2A. Moving the piston means 52 upwardly withdraws the lock pins 5 from the bore 21 so as to release the eccentric sheave 20 from such a locked state, as shown in FIGS. 1B and 2B. The positions of the second lock pins 5 are detected by a second position detecting device having sensor elements 55H and 55L which face the vertical connecting rod bore 4. These sensor elements suitably are conventional electro-optic or electromechanical sensors.

Figure 11:
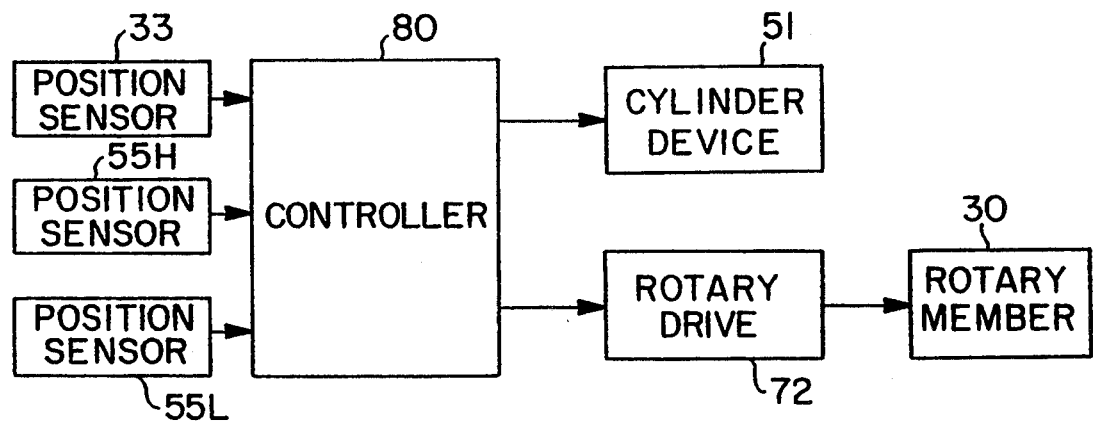
FIG. 11 is a schematic illustration of the lock pin drive control according to the first embodiment.

As is schematically illustrated in FIG. 11, the sensor elements 55H and 55L, as well as the position detecting sensor 33, are coupled to a controller 80. Controller 80 controls both the cylindrical device 51, and a rotary drive 72 for the rotary member 30.

Description next is given of operations to integrate the sheave 20 with the eccentric portion of the crankshaft. Before initiating such operations, the second lock pins 5 are positioned with their end portions 6 projecting into the sheave bore 21 as illustrated in FIGS. 1A and 2A. The first lock pins 12 and 16 are in their retracted positions, as shown also in FIG. 4A.

To integrate the sheave and crankshaft, a rotative force is applied by the rotary drive 72 (FIG. 11), to the outer shaft portion 31 of the rotary member 30, so as to rotate the rotary member 30 in the counter-clockwise direction (the direction of the arrow 30P in FIGS. 2A and 4B). As the rotary member 30 rotates, the cam pins 42 and 41 rotate respectively to push the first lock pins 12 and 16 outwardly in opposite directions, as indicated by the associated arrows 12P and 16P in FIG. 4B. As a result, the forward end portions 12F, 16F of the first lock pins 12, 16 enter the respective sheave bores 21, 23, thereby locking the eccentric sheave 20 to the eccentric portion 11. When the position detecting sensor 33 detects the resultant change in the rotational position of the rotary member 30, the controller 80 (see FIG. 11) activates the second lock pins moving means 50 to effect withdrawal of the second lock pins 5 from the sheave bore 21. The resulting positions of the first lock pins 12, 16 and the second lock pins 5 are illustrated in FIGS. 1B and 2B.

The eccentric sheave 20 is now fixed on opposite sides to the eccentric portion 11, and is free to rotate relative to the connecting rod 3. Thus, the eccentric 20 is capable of bearing a great load transmission torque, and of allowing the connecting rod 3 to perform smooth swinging and reciprocating movements.

In this condition, the crankshaft mechanism has its maximum eccentricity, that is, a composite eccentricity equal to e1+e2 (see FIG. 2B). As a result, the crankshaft mechanism can effect its maximum slide stroke and minimum number of strokes per minute (SPM), with each stroke taking place in accordance with the outer, large-diameter contour of the eccentric sheave 20. The press operations therefore can be performed with efficient S.N and P.V values (S.N and P.V (pressure times velocity) are common indices of performance of a press, and heat generation in the bearing portion of a press, respectively).

Description next is given of operations to integrate the sheave 20 with the connecting rod 3. It is here assumed that the crankshaft mechanism initially is in the state produced by the previously described operation, i.e., the state illustrated in FIGS. 1B and 2B, wherein the sheave 20 is integrated with crankshaft 10 by the first lock pins 12 and 16, and the second lock pins 5 are fully retracted into the connecting rod bore 4. To integrate the sheave and the connecting rod, first the piston means 52 of the second lock pins moving means 50 are actuated to push the second lock pins 5 downward to the abovedescribed projected position (FIGS. 1A, 2A). There, the tapered portions 6 of the second lock pins 5 are pressed downward against the tapered portion 22 of the corresponding sheath bore 21. As a result, the sheave 20 is locked to, and therefore integrated with, the connecting rod 3.

The changed position of the second lock pins 5 is detected by the second position detecting sensor element 55L. Thereafter, in response to such detection, the controller 80 activates the rotary drive 72 (FIG. 11) to rotate the rotary member 30 and cam pins, in the clockwise direction of the arrow 30R, to the positions shown in FIGS. 1A and 4A. Thus, the first lock pins 12 and 16 are retracted from the sheave bores 21 and 23, to the positions shown in FIGS. 1A and 2A.

The eccentric sheave 20 is now completely integrated with the connecting rod 3 by virtue of being locked thereto by the second lock pins 5. In this condition, the crankshaft mechanism has a composite eccentricity equal to the eccentricity e1 of the eccentric portion 11 per se, which is the minimum eccentricity obtainable with the crankshaft mechanism according to this embodiment. The crankshaft mechanism therefore can effect its minimum slide stroke and maximum SPM. Also, the eccentric sheave 20 slides on the bush 7 provided between the inner periphery of the sheave and the outer periphery of the eccentric portion 11. Therefore, the sheave 20 needs to bear only a small load transmission torque, and pressing operations can be performed with efficient S.N and P.V values.

Advantages of the above-described embodiment will now be described. By providing separate lock pins in the eccentric portion of the crankshaft and the connecting rod, which may be independently engaged with or disengaged from the sheave in the bottom dead center position of the mechanism, the slide stroke can be switched in two quick and easy stages, without altering the die height.

In the bottom dead center position of the illustrated embodiment, the sheave bores for the first lock pins, and the bore in the eccentric portion of the crankshaft, are coaxially aligned with a common vertical axis Y1, while the bore in the connecting rod is aligned with one of the sheave bores, for engagement by the second lock pins. Since the construction is simple, production costs can be greatly reduced. Further, replacement packings, etc. is not necessary, so that the mechanism can be easily maintained and operated.

Since the first lock pins moving means includes a rotary member and cam pins, which are capable of simultaneously switching the positions of the first lock pins between retracted and projected positions, quick and reliable integration and separation of the crankshaft eccentric portion and the eccentric sheave can be obtained. Furthermore, such switching operations enable the eccentric sheave to be securely fixed to the eccentric portion in such a manner that the composite structure is able to bear a great load transmission torque. Also, since the rotary member extends axially through the inside of the crankshaft, it is able to transmit a force from outside of the crankshaft to the cam pins. This structure permits the positions of the first lock pins to be controlled from the outside of the crankshaft with a force transmitted through the crankshaft, and thus requires a space of a smaller axial dimension than a conventional external-type press-stroke switching mechanism.

With only a short stroke of its piston means, the cylinder device, secured to the outer periphery of the upper end portion of the connecting rod, can quickly and securely switch the positions of the second lock pins, thereby to integrate and separate the connecting rod respectively with and from the eccentric sheave.

Since the forward tapered ends of the second lock pins are engageable with a tapered portion of the upper sheave bore, the connecting rod can be linked securely to the sheave, with these lock pins pushed radially in the direction of press load application in order to eliminate play in this direction. Thus, it is possible to perform pressing operations with a high level of precision. During the operations for changing the slide stroke, the eccentric sheave is always locked by the first lock pins to either or both of the crankshaft eccentric portion and the connecting rod. Thus, even during such operations, the eccentric sheave is never freely rotatable. Accordingly, when the slide stroke is being altered, changes in the die height cannot occur.

Moreover, by using sensors to detect the positions of the lock pins, further assurance can be provided that the pin switching operations are performed easily and reliably.

Although in the above-described embodiment, the upper sheave bore 21 is used both to receive the lock pin 16 when the sheave is to be locked to the crankshaft 10, and to receive the second lock pins 5 when the sheave is to be locked to the connecting rod, other embodiments are possible. That is, for example, a separate radial bore may be provided in the sheave 20, to the left or the right of the bore 21, in which case the connecting rod bore 4, the second lock pins 5 and the second lock pins moving means 50 are correspondingly moved to the left or the right, in and on the upper end portion 3U of the connection pin 3.

Figure 5:
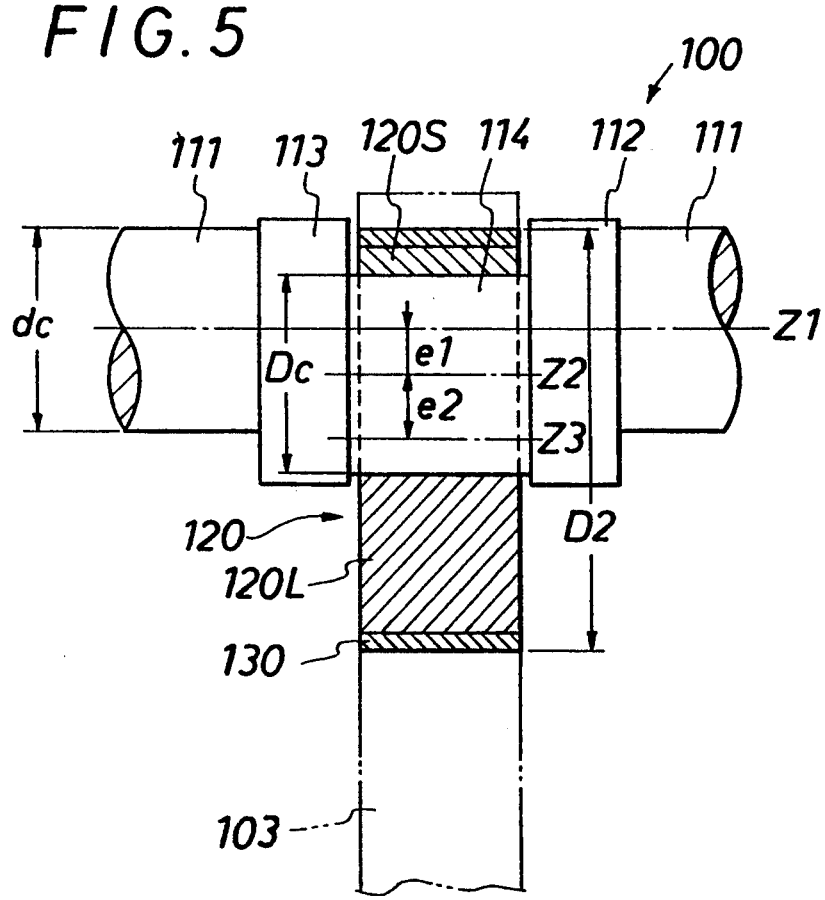
FIG. 5 is a longitudinal sectional view of an adjustable crankshaft mechanism according to a second embodiment of the invention, in an assembled state.
Figure 6:
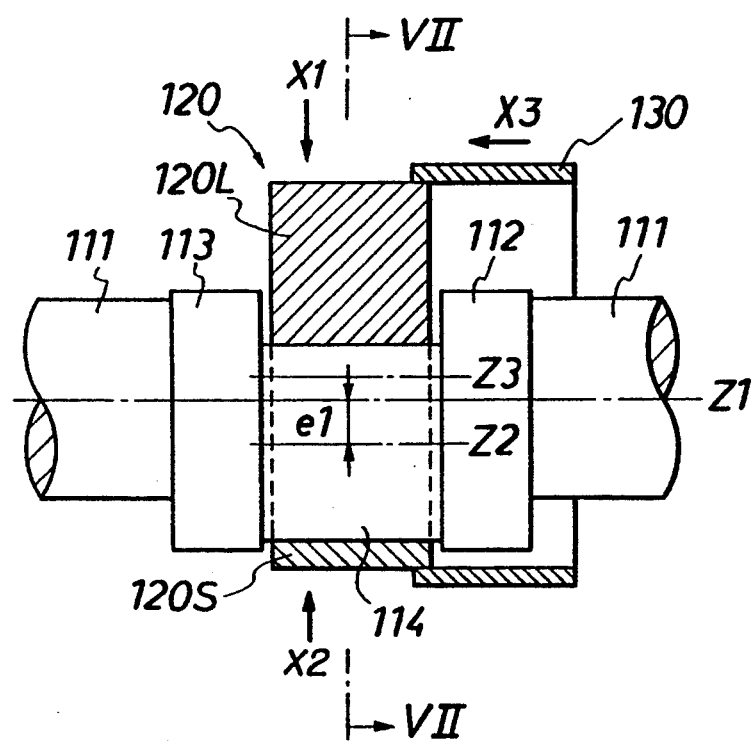
FIG. 6 is a longitudinal sectional view of the mechanism shown in FIG. 5, during assembly.
Figure 7:
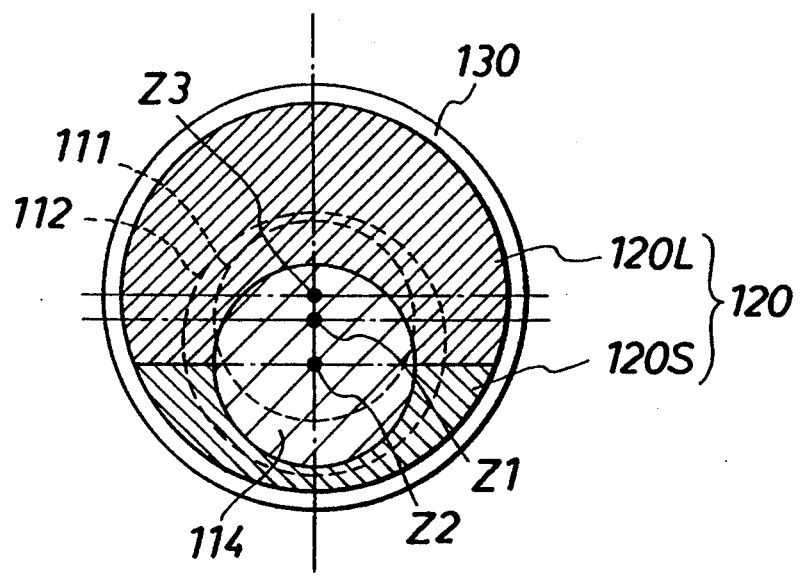
FIG. 7 is a sectional view taken on line VII—VII of FIG. 6.
Figure 8:
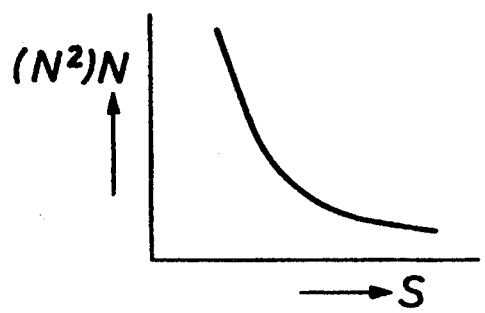
FIG. 8 is a graph illustrating the relationship between slide stroke and the pressing speed.
Figure 9:
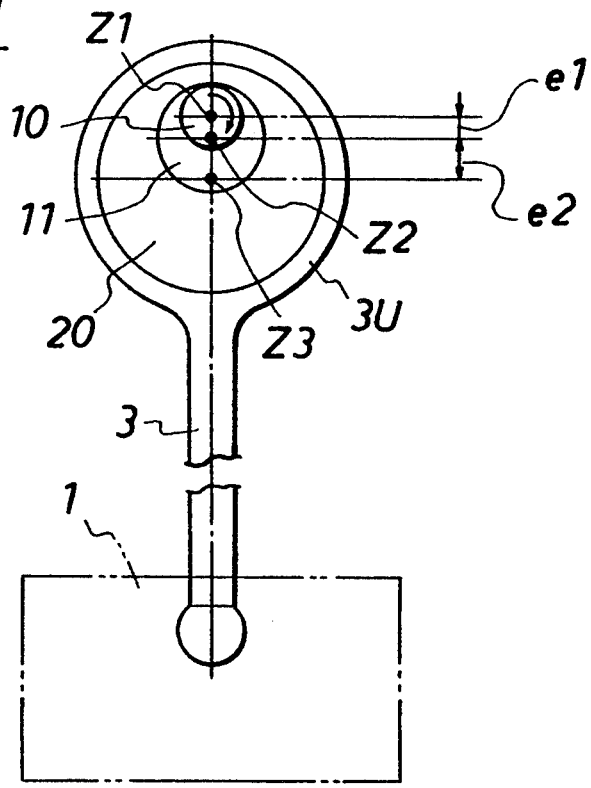
FIG. 9 is an schematic view of a conventional crankshaft mechanism.

Description next is given of a second embodiment of the invention, which is illustrated in FIGS. 5 through 7. Referring to FIG. 5, there is shown a crank structure 100 of a double-arm-type. The crank structure 100 comprises a crankshaft 111 having a pair of arms 112 and 113, and a crank-pin portion 114 provided between the arms. The arms 112 and 113 have diameters greater than the diameter of the crankshaft 111. The crankshaft 111 has a longitudinal center axis (crankshaft axis) Z1 about which it rotates when mounted in a suitable housing. The center (crank-pin axis) Z2 of the crank-pin portion 114 is spaced radially from the crankshaft axis Z1 a radial distance (eccentricity) e1. Thus, the crank-pin portion 114 constitutes a first eccentric section.

An eccentric sheave 120 is fitted on the crank-pin portion 114 so as to be rotatable therewith about the crankshaft axis Z1, as shown in FIG. 5. The sheave 120 has a center (sheave axis) Z3 spaced a radial distance e2 from crank-pin axis Z2. The eccentric sheave 120 therefore constitutes a second eccentric section.

In FIG. 5, the crank structure 100 is shown in a bottom dead center position, so that the axes Z1, Z2 and Z3 are positioned directly below one another, in a vertical plane. Thus, the crank structure 100 is in a state in which its composite eccentricity is maximized, having a value equal to the sum of the distances (eccentricities) e1 and e2. Therefore, the entire double-eccentric structure 100 is capable of assembly with a maximum composite eccentricity of (e1+e2).

As shown in FIGS. 6 and 7, the eccentric sheave 120 is formed in two pieces 120S and 120L, the piece 120L being larger than the piece 120S. Accordingly, the two pieces 120L and 120S can be brought radially inward to a position between the arms 112 and 113 and fitted on the crank-pin portion 114, as shown in FIG. 5. The eccentric sheave 120 alternatively may be formed in three or more pieces.

A ring member 130 serves to integrate the two pieces of the eccentric sheave 120 together on the crank-pin portion 114. For the purpose of such integration, the ring member 130 is sized to assure a tight fit over the eccentric sheave 120. A connecting rod 103, to be mounted on the circumference of the ring member 130, is indicated in FIG. 5 by two-dot-chain lines.

Figure 10:
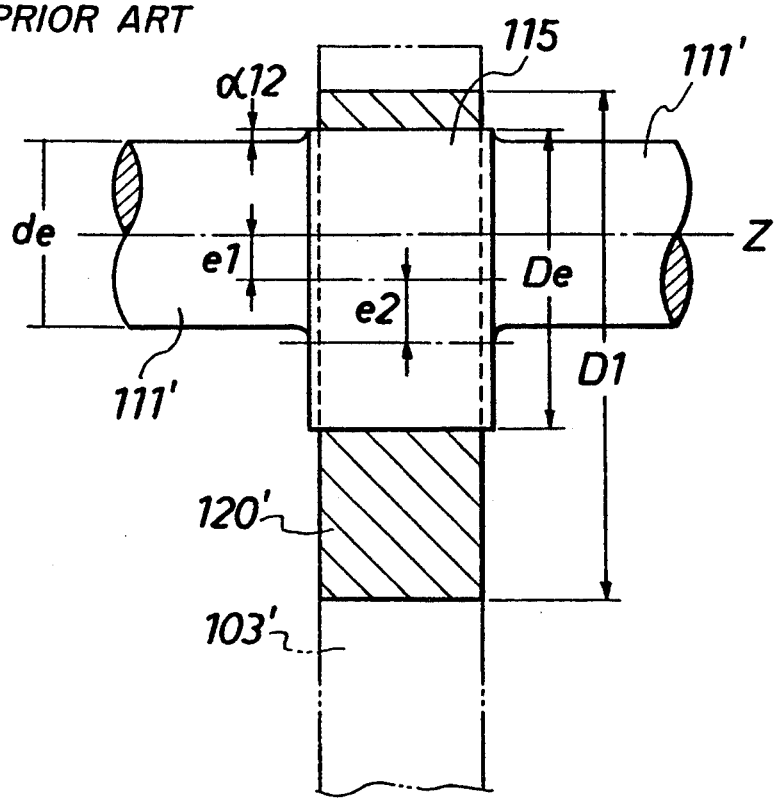
FIG. 10 is a longitudinal sectional view of another conventional crankshaft mechanism.

The advantages of the above-described crank structure are best understood by comparison of the structure to a conventional full-eccentric-type, double-eccentric crankshaft structure, such as the crankshaft structure 100' illustrated in FIG. 10. The conventional structure 100' has a crankshaft 111' of journal diameter de. The crankshaft 111' includes an integral crankshaft eccentric portion (first eccentric section) 115 of diameter De. An eccentric sheave (second eccentric section) 120' of outer diameter D1 is mounted on the eccentric portion 115.

The respective eccentricities of the eccentric sections 115 and 120' in FIG. 10 may be assumed to be the same as the eccentricities e1 and e2 of the embodiment illustrated in FIG. 5. Yet, the eccentric sheave 120, together with the ring member 130 fitted thereon, can have an outer diameter D2 smaller than the corresponding outer diameter D1 conventionally obtainable. In the illustrated example, $D1 = 1.17.D2$.

Such a decreased outer diameter is possible, without reducing the eccentricities e1 and e2, because the arm portions 112 and 113 provide structural support permitting the diameter Dc of crank-pin portion 114 to be reduced to a value equal or only slightly greater that the journal diameter dc ($Dc \geq dc$). By contrast, in FIG. 10 the diameter De of the eccentric portion 115 is substantially greater than the journal diameter de, so that the sheave diameter D1 must be correspondingly greater as well.

In the example shown in FIG. 5, the outer diameter dc of the crankshaft (journal) 111 is 1.1. times the corresponding outer diameter de of the conventional structure shown in FIG. 10, i.e., $dc = 1.1. de$. However, the arrangement of the invention more than compensates for the larger journal diameter by decreasing the diameter of the sheave. That is, in terms of reducing the structure's overall size, the achievement of a reduction in the outer diameter D2 of the eccentric sheave 120 is much more significant than an increase in the outer diameter of the crankshaft (journal) 111.

Moreover, the maximum rotational speed of the crankshaft is increased, since the maximum circumferential speed may be limited by other factors. Thus, if the maximum circumferential speed of the sheave 120 of FIG. 5 and that of the sheave of FIG. 10 are the same, then the maximum rotational speed of the, crankshaft in FIG. 5 will be greater than that of the crankshaft of FIG. 10, since the outer diameter D2 of the former sheave is less than the outer diameter D1 of the latter.

The composite eccentricity of the crank structure 100 is determined by three factors: (1) the values of the eccentricities e1 and e2, (2) whether the eccentric sheave is fixed to the crankshaft eccentric portion or the connecting rod, and if the latter, then also (3) the relative angle at which the sheave is fixed to the crankshaft eccentric portion. In accordance with the second embodiment of the invention, such adjustments may be made by any known adjusting mechanism, including one which alternatively fixes the sheave to the connecting rod or the crankshaft, and one which adjusts the relative angle of the sheave. Therefore an illustration of an adjusting mechanism is omitted from FIGS. 5 to 7.

Description next is made of the assembly of the second embodiment. First, as shown in FIGS. 6 and 7, the crankshaft 111 is held at its bottom dead center position, at which position the crank-pin axis Z2 is directly below the crankshaft axis Z1.

Subsequently, the larger piece 120L is brought from above in a radial direction (the direction of the arrow labeled X1 in FIG. 6), into the space between the arms 112 and 113, and fitted to the upper side of the crank-pin portion 114. Then, the smaller piece 120S is similarly brought from below (in the direction of the arrow labeled X2 in FIG. 6), into the space between the arms 112 and 113, and is fitted on the lower side of the crank-pin portion 114. The sheave pieces 120L and 120S are then held in these positions with a suitable tool or other means, while the ring member 130 is slid in the direction of the arrow X3, with the crankshaft 111 passing through the ring member 130. The ring member 130 is then fitted over the eccentric sheave 120 to hold its pieces 120L and 120S in place.

By the above-described procedure, the eccentric sheave 120 is integrally held together and assembled on the crank-pin portion 114. Thereafter, the composite eccentricity of the crank-pin portion 114 and sheave 120 and thus the stroke, may be adjusted according to the structural details provided for fixing the sheave to the crank pin portion and/or the connecting rod.

For example, the sheave 120 may be rotated to a desired angular position, and then fixed to the crank-pin portion 114 by conventional means generally of the type disclosed in U.S. Pat. No. 4,033,252. As a second example, the composite eccentricity may be adjusted by means such as are disclosed in U.S. Pat. No. 4,846,014, wherein the sheave alternatively may be fixed to the crank-pin portion or the connecting rod.

In the second example, with the crankshaft and sheave in the relative positions shown in FIG. 5, if, on the one hand, the eccentric sheave pieces 120L and 120S are fixed to the connecting rod 103, the composite eccentricity E equals e1 (the minimum value). On the other hand, if the eccentric sheave 120 is fixed to the crank-pin portion 114, the composite eccentricity E equals the sum e1+e2 (the maximum value). Thus, the stroke of the crank structure can be changed between values corresponding to maximum and minimum values of the composite eccentricity E.

Summarizing the above-described second embodiment, a crank-pin portion, of a double-arm-type crank structure, constitutes a first eccentric section, whose diameter can be limited to a value only slightly greater than the crankshaft diameter. An eccentric sheave, constituting a second eccentric section, is divided into pieces so that it can be fitted, piece-by-piece, onto the first eccentric section, from the radial direction. The pieces are integrated by a surrounding ring member. Such a structure facilitates easy and quick assembly, and moreover, the same maximum composite eccentricity (e1+e2) as that of the conventional full-eccentric-type, adjustable double-eccentric crankshaft structure, can be assured.

Furthermore, the outer diameter of the sheave can be greatly reduced in comparison to that of the conventional adjustable structure. For example, the outer diameter D2 of the sheave can be reduced to 85% or less of the diameter D2 of the conventional structure shown in FIG. 10. Accordingly, it is possible to achieve both a reduction in the size of the crankshaft structure and an increase in its rotational speed. Furthermore, since the crank-pin portion is provided between a pair of spaced apart arms, the structure has good mechanical balance, and is able to provide smooth rotational motion.

Figure 12:
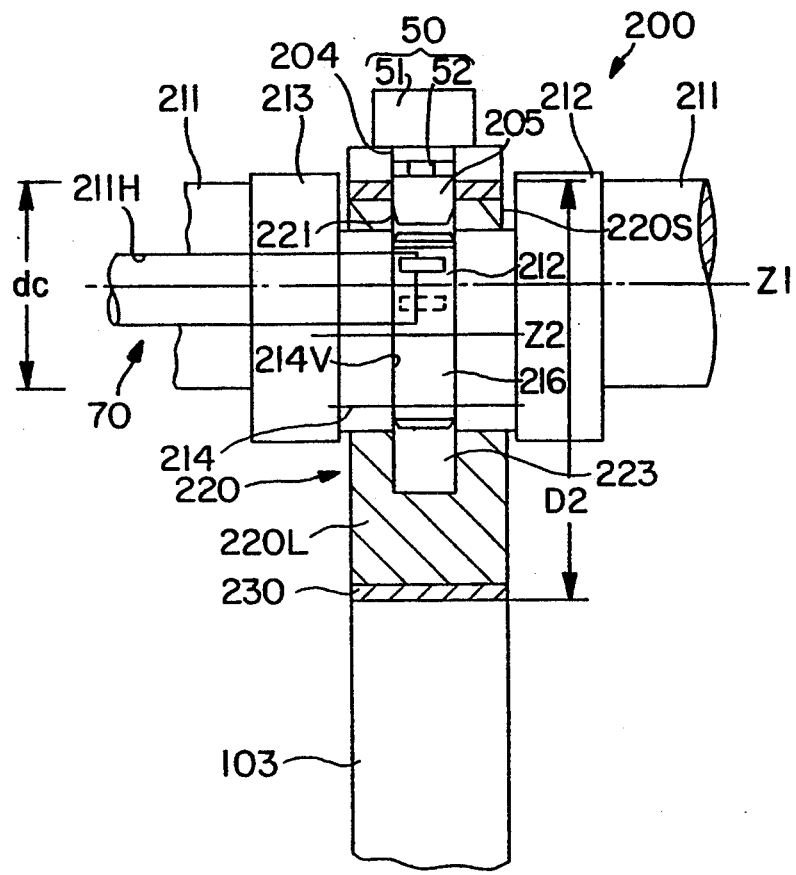
FIG. 12 is a schematic section view of an adjustable crankshaft mechanism according to a third embodiment of the invention.

Description next is given of a third embodiment of the invention, with reference to FIG. 12, wherein reference numerals common to FIGS. 1A through 5 designate the same or corresponding elements. The crankshaft mechanism 200 illustrated in FIG. 12 combines features of the above-described first and second embodiments of the invention so that the advantages of both are obtained. Thus, the crankshaft mechanism 200 comprises a crankshaft 211 having a pair of arms 112 and 113, and a crank-pin portion 214 provided between the arms. The arms 112 and 113 have diameters greater than the diameter of the crankshaft 211. The crankshaft 211 has a crankshaft axis Z1 about which it rotates when mounted in a suitable housing. The crank-pin axis Z2 of the crank-pin portion 214 is spaced radially from the crankshaft axis Z1 a distance (eccentricity) e1. Thus, the crank-pin portion 214 constitutes a first eccentric section.

An eccentric sheave 220 is fitted on the crank-pin portion 214 so as to be rotatable therewith about the crankshaft axis Z1, as shown in FIG. 12. The sheave 220 has a sheave axis Z3 spaced a radial distance e2 from crank-pin axis Z2. The sheave 220 therefore constitutes a second eccentric section.

In FIG. 12, the crank structure 200 is shown in a bottom dead center position, so that the axes Z1, Z2 and Z3 are positioned directly below one another, in a vertical plane. The eccentric sheave 220 is formed in two pieces 220S and 220L, the piece 220L being larger than the piece 220S. Accordingly, the two pieces 220L and 220S can be brought radially inward to a position between the arms 112 and 113 and fitted on the crank-pin portion 214, as shown in FIG. 12.

A ring member 230 serves to integrate the two pieces of the eccentric sheave 220 together on the crank-pin portion 214. A connecting rod 103 is rotatably mounted on the circumference of the ring member 230.

Like the first embodiment, the third embodiment provides for changes in composite eccentricity, and correspondingly the stroke, by alternatively and selectively integrating the sheave with the crank-pin portion or the connecting rod, using lock-pins in radial bores of the parts to be integrated. Thus, the crank-pin portion 214, the sheave 220, and the connecting rod 103 nave radial pin-receiving bores similar to those in the crankshaft eccentric portion, sheave and connecting rod of the first embodiment. That is, the crank-pin portion 214 has a radial crank-pin bore 214V, the sheave 220 has first and second radial sheave bores 221,223, and the connecting rod 103 has a radial connecting rod bore 204. Therefore, all of the bores 214V, 221,223 and 204 have radial axes which intersect the crankshaft axis Z1, and which become aligned with each other when the crankshaft 211 and the sheave 220 are in bottom dead center positions, as shown in FIG. 12.

A first pair of lock pins 212,216, similar to the pair of lock pins 12, 16 of the first embodiment, is provided in the crank-pin bore 214V. The first lock pins 212, 216 are selectively movable in opposite radial directions into engagement with the respective sheave bores 221 and 223, in order to fix the sheave 220 to the crank-pin portion 214 for rotation therewith. A second pair of lock pins 205, similar to the pair of lock pins 5 of the first embodiment, is provided in the connecting rod bore 204. The second lock pins 205 are selectively movable in the bore 204 to engage with the upper sheave bore 221, so as to fix the sheave 220 to the connecting rod 103.

An axial bore 211H is provided in the crankshaft 211. The axial bore 211H opens into the radial crank-pin bore 214V. A first lock pins moving means 70 is provided for moving and holding the first lock pins 212, 216 in the bore 214V. A second lock pins moving means is provided on an upper end portion of the connecting rod 103 for moving and holding the second lock pins 205 in the bore 204.

The operation and structure of the lock pins 221,223 and 205, and the lock pins moving means 70 and 50, are substantially the same as those of the first embodiment. Therefore, their detailed description is omitted for the sake of brevity.

The above-described third embodiment has all of the advantages of the first and second embodiments, making it easy to:
achieve both a reduction in the size of the crankshaft structure and an increase in its rotational speed,
good mechanical balance,
smooth rotational motion,
change the slide stroke without altering the die height,
maintain a simplicity of construction,
reduce production costs
avoid replacement of packings, etc. so as to simplify maintenance and operation of the equipment,
quickly and reliably integrate and separate of the crank-pin portion and the eccentric sheave,
allow the eccentric sheave safely to bear a great load transmission torque,
utilize a space of a smaller axial dimension than a conventional external-type press-stroke switching mechanism, and
prevent free movement of the eccentric sheave at all times, so that when the slide stroke is being altered, changes in the die height cannot occur.

It is to be noted that the invention is not limited to the above-described embodiments, but various modifications and changes, as will be readily understood by those skilled in the art, can be made thereto, without deviating from the invention, which is limited only by the appended claims.

What is claimed is:

1. A crankshaft mechanism, comprising
a housing;
an eccentric crankshaft having a crankshaft axis, said crankshaft being rotatable in said housing about said crankshaft axis, said crankshaft having a cylindrical eccentric portion, a center of said eccentric portion being displaced radially from said crankshaft axis;
an eccentric sheave rotatably mounted on the outer circumference of said eccentric portion, said sheave having an outer circumference with a center displaced radially from the center of said eccentric portion;
a connecting member rotatably mounted on the outer circumference of said sheave;
said eccentric portion, said sheave, and said connecting member having pin-receiving bores formed therein, said pin-receiving bores having axes intersecting said crankshaft axis, said pin-receiving bores including a first bore in said eccentric portion, a second bore in said connecting member, and at least one third bore in said sheave, the first and second bores both being aligned with said at least one third bore when said crankshaft and said sheave are in predetermined angular positions;
a first lock pin means in said first bore, selectively engageable with said at least one third bore to fix said sheave to said eccentric portion for rotation therewith; and
a second lock pin means in said second bore, selectively engageable with said at least one third bore to fix said sheave to said connecting member;

wherein said at least one third bore comprises a pair of third bores, said first lock pin means comprising a pair of first lock pins, engageable simultaneously with said third bores, said crankshaft having an axial bore, the mechanism further comprising:
first lock pins moving means for simultaneously moving said pair of first lock pins in the axial direction of said first bore, said first lock pins moving means including
a rotary member rotatably fitted in said axial bore, and
means, responsive to rotation of said rotary member, for projecting and retracting said pair of first lock pins respectively into and from said pair of third bores; and
a first position detecting sensor, provided on an outer shaft portion of said rotary member, for detecting the rotational position of said rotary member.

2. A crankshaft mechanism, comprising
a housing;
an eccentric crankshaft having a crankshaft axis and an axial bore, said crankshaft being rotatable in said housing about said crankshaft axis, said crankshaft having a cylindrical eccentric portion, a center of said eccentric portion being displaced radially from said crankshaft axis;
an eccentric sheave rotatably mounted on the outer circumference of said eccentric portion, said sheave having an outer circumference with a center displaced radially from the center of said eccentric portion;
a connecting member rotatably mounted on the outer circumference of said sheave;
said eccentric portion, said sheave, and said connecting member having pin-receiving bores formed therein, said pin-receiving bores having axes intersecting said crankshaft axis, said pin-receiving bores including a first bore in said eccentric portion, a second bore in said connecting member, and a pair of third bores in said sheave, the first and second bores both being aligned with said pair of third bores when said crankshaft and said sheave are in predetermined angular positions;
a first lock pin means, said first lock pin means including a pair of first lock pins, movable to simultaneously engage with said pair of third bores to fix said sheave to said eccentric portion for rotation therewith;
first lock pins moving means for simultaneously moving said pair of first lock pins in the axial direction of said first bore, said first lock pins moving means including means, disposed in said axial bore, for projecting and retracting said pair of first lock pins respectively into and from said pair of third bores; and
a second lock pin means in said second bore, movable selectively to engage one of said pair of third bores to fix said sheave to said connecting member.

3. A crankshaft mechanism according to claim 2, further comprising means, disposed on said connecting rod, for moving said second lock pin means in the axial direction of said second bore.

4. A crankshaft mechanism according to claim 3, wherein said second lock pin moving means comprises a cylinder device having piston means connected to said second lock pin means.

5. A crankshaft mechanism according to claim 2, wherein said second lock pin means comprises lock pins having tapered end portions confronting said eccentric sheave.

6. A crankshaft mechanism according to claim 2, wherein said first and second bores both are aligned with said at least one third bore when the crankshaft mechanism is at a predetermined bottom dead center position.

7. A crankshaft mechanism according to claim 2, wherein said crankshaft further comprises
shaft sections on opposite sides of said eccentric portion, said shaft sections centered on said crankshaft axis, and
arm portions between said shaft portions on opposite side of said eccentric portion;
further comprising a ring member fitted over said sheave.

8. A crankshaft mechanism according to claim 7, wherein said eccentric sheave comprises a divided structure capable of being fitted onto said crank-pin portion from a radial direction.

9. A crankshaft mechanism according to claim 8, wherein the divided structure of said eccentric sheave is composed of two pieces.

10. A crankshaft mechanism according to claim 8, wherein said arm portions each have a diameter greater than a diameter of the shaft portions, said eccentric portion having a diameter which is less than the diameter of each arm portion, said ring member integrating said divided structure of said sheave, said connecting member including a connecting rod rotatably mounted on the circumference of said ring member.

11. A crankshaft mechanism according to claim 7, wherein said arm portions each have a diameter greater than a diameter of the shaft sections, said eccentric portion having a diameter which is less than the diameter of each arm portion, said connecting member including a connecting rod rotatably mounted on the circumference of said ring member.

12. A crankshaft mechanism, comprising
a housing;
an eccentric crankshaft having a crankshaft axis, said crankshaft being rotatable in said housing about said crankshaft axis, said crankshaft having a cylindrical eccentric portion, a center of said eccentric portion being displaced radially from said crankshaft axis;
an eccentric sheave rotatably mounted on the outer circumference of said eccentric portion, said sheave having an outer circumference with a center displaced radially from the center of said eccentric portion;
a connecting member rotatably mounted on the outer circumference of said sheave;
said eccentric portion, said sheave, and said connecting member having pin-receiving bores formed therein, said pin-receiving bores having axes intersecting said crankshaft axis, said pin-receiving bores including a first bore in said eccentric portion, a second bore in said connecting member, and at least one third bore in said sheave, the first and second bores both being aligned with said at least one third bore when said crankshaft and said sheave are in predetermined angular positions;
a first lock pin means in said first bore, movable selectively to engage said at least one third bore to fix said sheave to said eccentric portion for rotation therewith, said first lock pin means comprising pair of first lock pins, each of said first lock pins having a projection at an inward end portion thereof, partially defined by a notch in the inward end portion, the projection of each first lock pin being received in the notch of the other first lock pin so that the projections overlap, said projections each having a transverse groove extending transversely to a center axis of said first bore;

first lock pins moving means, engaged in the transverse grooves for moving said pair of first lock pins in the axial direction of said first bore; and a second lock pin means in said second bore, movable to selectively engage said at least one third bore to fix said sheave to said connecting member.

13. A crankshaft mechanism, comprising a housing;

an eccentric crankshaft having a crankshaft axis and an axial bore, said crankshaft being rotatable in said housing about said crankshaft axis, said crankshaft having a cylindrical eccentric portion, a center of said eccentric portion being displaced radially from said crankshaft axis;

an eccentric sheave rotatably mounted on the outer circumference of said eccentric portion, said sheave having an outer circumference with a center displaced radially from the center of said eccentric portion;

a connecting member rotatably mounted on the outer circumference of said sheave;

said eccentric portion, said sheave, and said connecting member having pin-receiving bores formed therein, said pin-receiving bores having axes intersecting said crankshaft axis, said pin-receiving bores including a first bore in said eccentric portion communicating with said axial bore, a second bore in said connecting member, and at least one third bore in said sheave, the first and second bores both being aligned with said at least one third bore when said crankshaft and said sheave are in predetermined angular positions;

a first lock pin means, said first lock pin means including a pair of first lock pins in said first bore, movable selectively to engage said at least one third bore to fix said sheave to said eccentric portion for rotation therewith, said first lock pins each having a transverse groove extending transversely to a center axis of said first bore;

first lock pins moving means for moving said pair of first lock pins in the axial direction of said first bore, said first lock pins moving means including a rotary member rotatably fitted in said axial bore, said rotary member having a pair of cam pins at an inner end thereof, engaged in said transverse grooves for moving said first lock pins in said axial direction of said first bore when said rotary member is rotated; and a second lock pin means in said second bore, movable selectively to engage said at least one third bore to fix said sheave to said connecting member.

14. A crankshaft mechanism, comprising a housing;

an eccentric crankshaft having a crankshaft axis, said crankshaft being rotatable in said housing about said crankshaft axis, said crankshaft having a cylindrical eccentric portion, a center of said eccentric portion being displaced radially from said crankshaft axis;

an eccentric sheave rotatably mounted on the outer circumference of said eccentric portion, said sheave having an outer circumference with a center displaced radially from the center of said eccentric portion;

a connecting member rotatably mounted on the outer circumference of said sheave;

said eccentric portion, said sheave, and said connecting member having pin-receiving bores formed therein, said pin-receiving bores having axes intersecting said crankshaft axis, said pin-receiving bores including a first bore in said eccentric portion, a second bore in said connecting member, and a pair of third bores in said sheave, the first and second bores both being aligned with said pair of third bores when said crankshaft and said sheave are in predetermined angular positions;

a first lock pin means including a pair of first lock pins in said first bore, said pair of first lock pins movable selectively to engage simultaneously with said pair of third bores to fix said sheave to said eccentric portion for rotation therewith;

a first lock pins moving means for simultaneously moving said pair of first lock pins in the axial direction of said first bore, said first lock pins moving means including a rotary member, rotatably fitted in said axial bore, and means, disposed at an inner end of said rotary member and responsive to rotation of said rotary member, for projecting and retracting said pair of first lock pins respectively into and from said pair of third bores; and a second lock pin means in said second bore, movable selectively to engage one of said pair of third bores to fix said sheave to said connecting member.

15. A crankshaft mechanism according to claim 14, wherein said first lock pins moving means further comprises means for controlling rotation of said rotary member, said rotation controlling means including:

a flange integrated with said crankshaft, and pressure media, including a bush on an outer end of a shaft portion of said rotary member, controllable to apply a friction force between an outer peripheral surface of said outer shaft portion and said flange.

16. A crankshaft mechanism, comprising a housing;

an eccentric crankshaft having a crankshaft axis, said crankshaft being rotatable in said housing about said crankshaft axis, said crankshaft having a cylindrical eccentric portion, a center of said eccentric portion being displaced radially from said crankshaft axis;

an eccentric sheave rotatably mounted on the outer circumference of said eccentric portion, said sheave having an outer circumference with a center displaced radially from the center of said eccentric portion;

a connecting member rotatably mounted on the outer circumference of said sheave;

said eccentric portion, said sheave, and said connecting member having pin-receiving bores formed therein, said pin-receiving bores having axes intersecting said crankshaft axis, said pin-receiving bores including a first bore in said eccentric portion, a second bore in said connecting member, and at least one third bore in said sheave, the first and second bores both being aligned with said at least one third bore when said crankshaft and said sheave are in predetermined angular positions;

a first lock pin means in said first bore, selectively engageable with said at least one third bore to fix said sheave to said eccentric portion for rotation therewith;

a second lock pin means in said second bore, selectively engageable with said at least one third bore to fix said sheave to said connecting member;

means, disposed on said connecting member, for moving said second lock pin means in the axial direction of said second bore; and a second lock pin position sensor, facing said second bore, for detecting the position of said second lock pin means.

17. A crankshaft mechanism according to claim 16, wherein said second lock pin means comprises second lock pins having tapered end portions confronting said eccentric sheave.

18. A crankshaft mechanism according to claim 17, wherein said second lock pins moving means comprises a cylinder device having piston means connected to said second lock pins.

* * * * *